(12) United States Patent
Ions et al.

(10) Patent No.: US 8,933,604 B2
(45) Date of Patent: Jan. 13, 2015

(54) ROTOR CORE ASSEMBLY

(75) Inventors: David Ions, Malmesbury (GB); Paul Theo Heyting, Malmesbury (GB); Matthew John Childe, Malmesbury (GB); David Michael Jones, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 559 days.

(21) Appl. No.: 13/212,849

(22) Filed: Aug. 18, 2011

(65) Prior Publication Data
US 2012/0049661 A1   Mar. 1, 2012

(30) Foreign Application Priority Data

Aug. 24, 2010 (GB) .................................. 1014073.9
Jan. 20, 2011 (GB) .................................. 1100987.5

(51) Int. Cl.
| *H02K 21/12* | (2006.01) |
| *H01F 41/02* | (2006.01) |
| *H02K 1/27* | (2006.01) |
| *H02K 15/03* | (2006.01) |
| *H02K 15/12* | (2006.01) |

(52) U.S. Cl.
CPC .............. *H01F 41/02* (2013.01); *H02K 1/2733* (2013.01); *H02K 15/03* (2013.01); *H02K 15/12* (2013.01)
USPC ..................... 310/156.08; 310/43; 310/156.21

(58) Field of Classification Search
USPC ............................. 310/43, 45, 156.08–156.31
See application file for complete search history.

(56) References Cited

U.S. PATENT DOCUMENTS

| 4,433,261 | A | | 2/1984 | Nashiki et al. | |
| 4,639,627 | A | | 1/1987 | Takekoshi et al. | |
| 4,759,116 | A | | 7/1988 | Jones | |
| 4,942,322 | A | | 7/1990 | Raybould et al. | |
| 5,040,286 | A | * | 8/1991 | Stark | 29/598 |
| 5,332,460 | A | | 7/1994 | Hosoya | |
| 5,563,463 | A | | 10/1996 | Stark | |
| 5,881,448 | A | | 3/1999 | Molnar | |
| 6,072,252 | A | * | 6/2000 | Van Dine et al. | 310/43 |
| 6,437,474 | B1 | | 8/2002 | Chu | |
| 7,120,986 | B2 | | 10/2006 | Kojima et al. | |
| 7,812,495 | B2 | * | 10/2010 | Shiao et al. | 310/156.22 |
| 2003/0178903 | A1 | * | 9/2003 | Rapp | 310/156.28 |
| 2004/0111869 | A1 | | 6/2004 | Mikkelsen | |

(Continued)

FOREIGN PATENT DOCUMENTS

| DE | 3622231 | 1/1988 |
| DE | 10 2004 058 414 | 6/2006 |

(Continued)

OTHER PUBLICATIONS

Search Report dated Oct. 31, 2011, directed to GB Application No. 1100987.5; 1 page.

(Continued)

*Primary Examiner* — Thanh Lam
(74) *Attorney, Agent, or Firm* — Morrison Foerster LLP

(57) ABSTRACT

A rotor core assembly that includes a magnet, a first end cap located at an end of the magnet, a second end cap located at an opposite end of the magnet, and a sleeve that surrounds the magnet and the end caps. The sleeve forms an interference fit with each of the end caps, and an adhesive is located between the magnet and the sleeve. Additionally, a method of manufacturing the rotor core assembly.

8 Claims, 7 Drawing Sheets

(56) References Cited

U.S. PATENT DOCUMENTS

| | | |
|---|---|---|
| 2004/0221444 A1 | 11/2004 | Fujii et al. |
| 2007/0138891 A1 | 6/2007 | Hurst |
| 2007/0290566 A1 | 12/2007 | Mizutani et al. |
| 2008/0018196 A1 | 1/2008 | Enomoto et al. |
| 2008/0031748 A1 | 2/2008 | Ihle et al. |
| 2009/0284094 A1 | 11/2009 | Horng et al. |
| 2010/0117473 A1 * | 5/2010 | Masoudipour et al. .. 310/156.28 |
| 2010/0209872 A1 | 8/2010 | Kuhn et al. |
| 2012/0049662 A1 | 3/2012 | Ions et al. |
| 2012/0112861 A1 | 5/2012 | Childe et al. |

FOREIGN PATENT DOCUMENTS

| | | |
|---|---|---|
| EP | 0 218 477 | 4/1987 |
| EP | 0 854 558 | 7/1998 |
| EP | 1 075 073 | 2/2001 |
| EP | 1 223 662 | 7/2002 |
| EP | 1 710 892 | 10/2006 |
| EP | 2 113 986 | 11/2009 |
| GB | 2 172 443 | 9/1986 |
| JP | 61-199449 | 9/1986 |
| JP | 63-92246 | 4/1988 |
| JP | 2-241342 | 9/1990 |
| JP | 3-253249 | 11/1991 |
| JP | 6-233502 | 8/1994 |
| JP | 10-210690 | 8/1998 |
| JP | 2003-9476 | 1/2003 |
| JP | 2004-523194 | 7/2004 |
| JP | 2007-267574 | 10/2007 |
| WO | WO-98/34324 | 8/1998 |
| WO | WO-02/056442 | 7/2002 |

OTHER PUBLICATIONS

Childe et al., U.S. Office Action mailed Oct. 28, 2013, directed to U.S. Appl. No. 13/285,841; 7 pages.

Childe et al., U.S. Office Action mailed Apr. 26, 2013, directed to U.S. Appl. No. 13/285,841; 7 pages.

International Search Report and Written Opinion mailed Nov. 15, 2011, directed to International Application No. PCT/GB2011/051471; 9 pages.

Search Report dated Nov. 30, 2010, directed to GB Application No. 1014073.9; 1 page.

International Search Report and Written Opinion mailed Nov. 15, 2011, directed to International Application No. PCT/GB2011/051472; 10 pages.

* cited by examiner

ROTOR CORE ASSEMBLY

REFERENCE TO RELATED APPLICATIONS

This application claims the priorities of United Kingdom Application No. 1014073.9, filed Aug. 24, 2010, and United Kingdom Application No. 1100987.5, filed Jan. 20, 2011, the entire contents of which are incorporated herein by reference.

FIELD OF THE INVENTION

The present invention relates to a rotor core assembly for an electrical machine.

BACKGROUND OF THE INVENTION

The rotor of an electrical machine may comprise a magnet secured to a shaft. As the rotor rotates, radial forces stress the magnet. Many magnets are relatively brittle and will fracture if subjected to excessive tensile stress. Consequently, a reinforcing sleeve may be provided around the magnet.

Conventional methods of securing a sleeve about a magnet include press-fitting the magnet into the sleeve. However, owing to tolerances in the outer surface of the magnet and the inner surface of the sleeve, there will be locations at which the magnet is not in direct contact with the sleeve. Stresses acting on the magnet will not therefore be transferred to the sleeve at these locations. As a result, the magnet may fracture. Although the sleeve may prevent the magnet from breaking apart, the fracture may bring about a slight mass redistribution of the magnet, resulting in rotor imbalance.

An alternative method involves applying a high-viscosity adhesive to the inner surface of the sleeve and the outer surface of the magnet. The sleeve is then slid over the magnet and the adhesive is cured. However, there are several disadvantages with this method of securement. First, owing to tolerances and other imperfections in the surfaces of the magnet and the sleeve, there may be locations at which the adhesive does not extend fully between the magnet and the sleeve. Consequently, there will be locations at which stresses are not transferred from the magnet to the sleeve, which may result in magnet fracture. Second, the sleeve is poorly constrained relative to the shaft. As a result, the position of the sleeve may drift with use of the rotor due to adhesive creep. Any movement in the sleeve will introduce a rotor imbalance. Third, tolerances in the magnet and the sleeve may mean that an excessive amount of adhesive must be applied to the surfaces in order to achieve a good adhesive join. Consequently, the method is particularly wasteful in terms of adhesive. Fourth, owing to the relatively high viscosity of the adhesive, cleaning excess adhesive from the rotor is generally difficult.

SUMMARY OF THE INVENTION

In a first aspect, the present invention provides a rotor core assembly comprising a magnet, a first end cap located at an end of the magnet, a second end cap located at an opposite end of the magnet, a sleeve that surrounds the magnet and the end caps, the sleeve forming an interference fit with each of the end caps, and an adhesive located between the magnet and the sleeve.

The adhesive provides a medium through which tensile stresses acting on the magnet may be transferred to the sleeve. Accordingly, excessive strain and fracture of the magnet may be avoided.

The end caps act to align and radially constrain the sleeve. As a result, the position of the sleeve is prevented from drifting during subsequent rotation of the rotor core assembly. Imbalance in the rotor core assembly due to movement of the sleeve is thus prevented.

The magnet may form a clearance fit with the sleeve. The adhesive then fills the clearance between the magnet and the sleeve so as to form a continuous layer. Alternatively, the magnet may form a transition or interference fit with the sleeve. As a result, there will be locations at which the magnet is in direct contact with sleeve and locations at which a clearance exists between the magnet and the sleeve. The adhesive then fills locations at which a clearance exists. Accordingly, irrespective of whether a clearance, transition or interference fit exists between the magnet and the sleeve, tensile stresses are transferred from the magnet to the sleeve over the full outer surface of the magnet.

The rotor core assembly may comprise a bore that extends through the end caps and the magnet. Accordingly, the rotor core assembly may be conveniently secured to a shaft, e.g. by means of an adhesive.

Owing to the properties of many magnet materials, it is generally difficult to machine a magnet with a bore having relatively tight tolerances. Accordingly, the end caps may be secured to the magnet such that the outer diameter of the magnet is concentric with the inner diameters of the end caps. Accordingly, the outer diameter of the magnet may be concentrically aligned with a shaft irrespective of any eccentricity in the bore of the magnet. To this end, the outer diameter of the magnet may have a concentricity relative to the shaft that is smaller than the concentricity of the inner diameter of the magnet relative to the shaft.

The end caps may be secured to the magnet by an adhesive. This then provides a convenient method of securing the end caps to the magnet. The adhesive used to secure the end caps to the magnet may be different to that located between the magnet and the sleeve. In particular, the end caps may be secured to the magnet using an adhesive that is unsuited to filling the clearance between the magnet and the sleeve. For example, the end caps may be secured to the magnet using an adhesive that cures relatively quickly in atmospheric moisture. This then has the advantage that the end caps can be secured relatively quickly and easily to the magnet.

Each end cap may be formed of plastic. This then reduces the cost and weight of the rotor core assembly. Additionally, the end caps do not adversely interfere or distort the magnet flux of the magnet, and are not susceptible to inductive heating.

In a second aspect, the present invention provides a method of manufacturing a rotor core assembly, the method comprising: providing an assembly comprising a magnet, a first end cap located at one end of the magnet, a second end cap located at an opposite end of the magnet, and a sleeve surrounding the magnet and the ends caps, the sleeve forming an interference fit with each of the end caps; introducing an adhesive into a clearance between the magnet and the sleeve; and curing the adhesive.

The end caps serve to align and constrain the sleeve. Additionally, the end caps serve to contain the adhesive introduced into the clearance such that, if need be, the assembly may be transported and/or washed prior to curing.

One of the end caps may comprise a groove or through-hole. Introducing the adhesive into the clearance may then comprise placing the assembly into a vessel and employing vacuum impregnation to introduce adhesive into the clearance via the groove or through-hole. In particular, the method may comprise immersing the assembly in adhesive located in the vessel, reducing the pressure within the vessel to evacuate the clearance, and increasing the pressure within the vessel to drive adhesive into the clearance. The assembly may be immersed in the adhesive before (wet vacuum impregnation) or after (dry vacuum impregnation) the pressure in the vessel is reduced.

Providing the assembly may comprise providing a sub-assembly comprising the magnet, the first end cap and the second end cap, each end cap being secured to an end of the magnet, and then inserting the sub-assembly into the sleeve, the sleeve forming an interference fit with each of the end caps.

The adhesive may be introduced into the clearance as the sub-assembly is inserted into the sleeve. In particular, the method may comprise placing one of the sleeve and the sub-assembly into a bath containing an adhesive such that inserting the sub-assembly into the sleeve causes adhesive to be retained in the clearance between the magnet and the sleeve. As a result, a continuous distribution of adhesive is achieved between the magnet and the sleeve along the full length of the magnet.

The assembly may comprise a bore that extends through the end caps and the magnet. Accordingly, the assembly may be conveniently secured to a shaft, e.g. by means of an adhesive. Indeed, if so desired, a shaft may be secured within the bore prior to the introduction of adhesive into the clearance between the magnet and the sleeve.

The method may comprise preventing adhesive from entering the bore in the magnet. This then ensures that a clean surface is maintained for securing the rotor core assembly to a shaft.

In a third aspect, the present invention provides a method of manufacturing a rotor core assembly, the method comprising: providing an assembly comprising a magnet, a first end cap located at one end of the magnet, a second end cap located at an opposite end of the magnet, and a sleeve surrounding the magnet and the ends caps, wherein the sleeve forms an interference fit with each of the end caps, a clearance is formed between the magnet and the sleeve, and one of the end caps comprises a groove or through-hole; placing the assembly into a vessel; employing vacuum impregnation to introduce adhesive into the clearance via the groove or through-hole; and curing the adhesive.

In a fourth aspect, the present invention provides a method of manufacturing a rotor core assembly, the method comprising: providing a sleeve; providing a sub-assembly comprising a magnet, a first end cap secured to an end of the magnet, and a second end cap secured to an opposite end of the magnet; placing one of the sleeve and the sub-assembly into a bath containing an adhesive; inserting the sub-assembly into the sleeve, the sleeve forming an interference fit with each of the end caps and a clearance fit with the magnet, and adhesive being retained in the clearance between the magnet and the sleeve; and curing the adhesive between the magnet and the sleeve.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
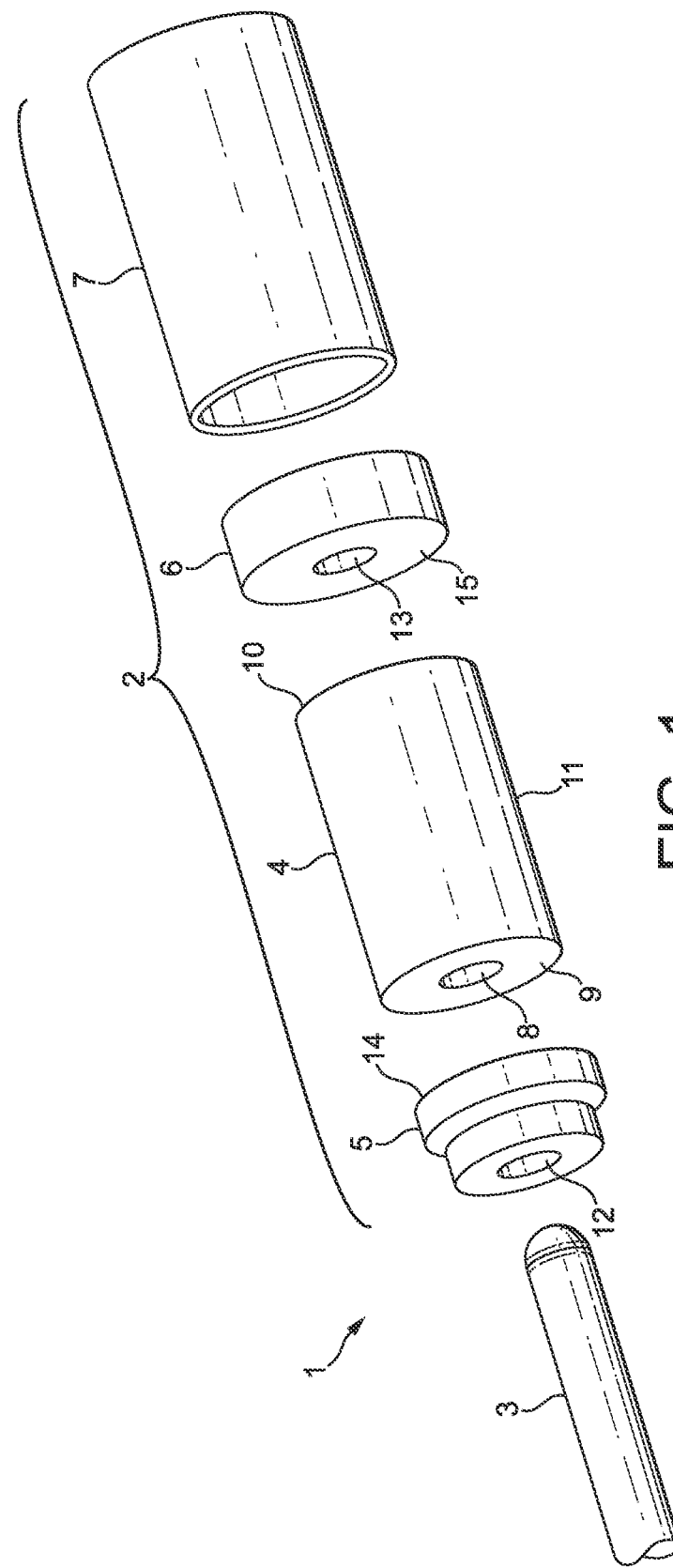
FIG. 1 is an exploded view of a rotor in accordance with the present invention.
Figure 2:
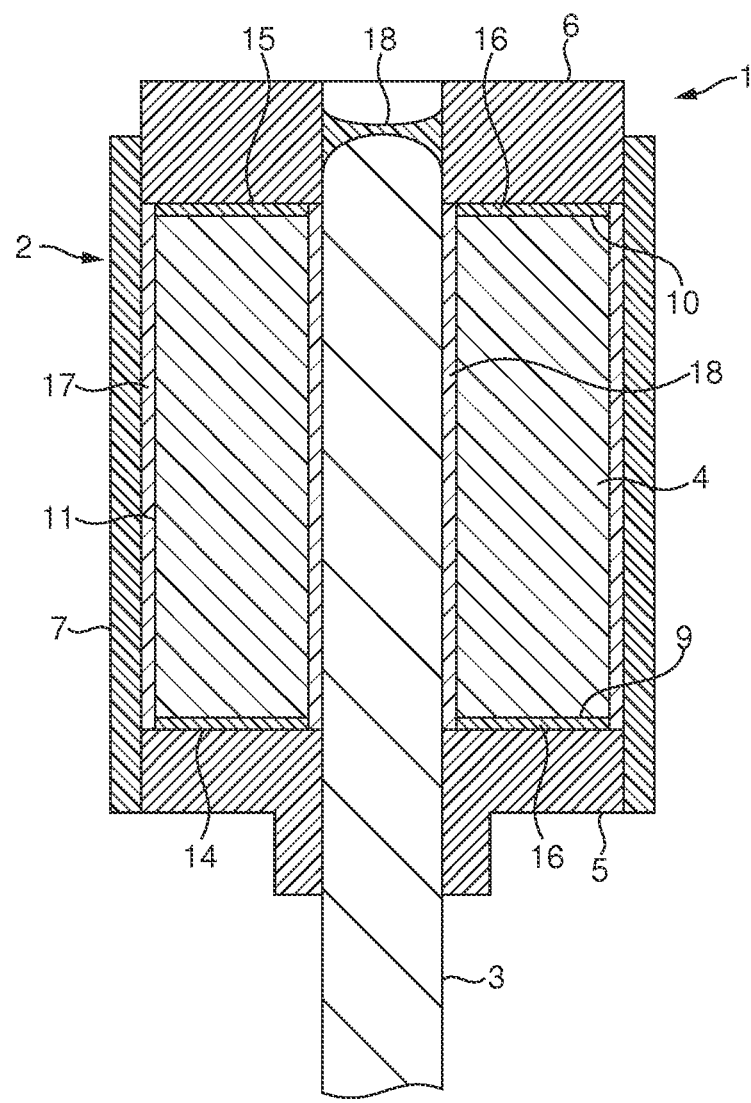
FIG. 2 is a sectional view of the rotor.
Figure 3:
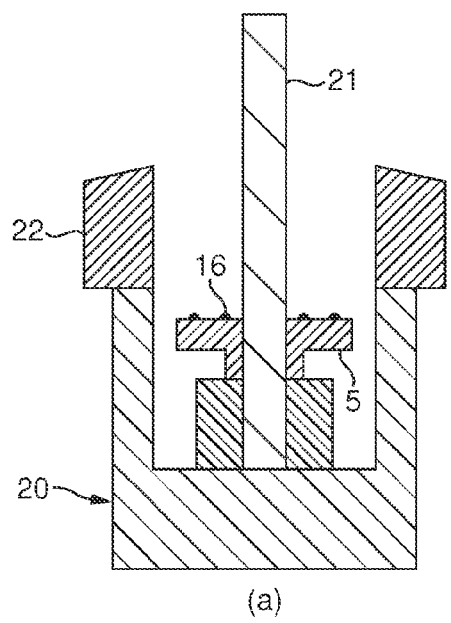
FIGS. 3a-3d illustrate a first stage in the manufacture of the rotor.
Figure 3:
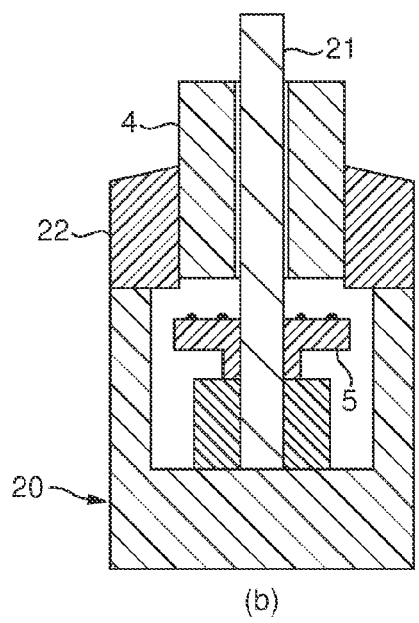
Figure 3:
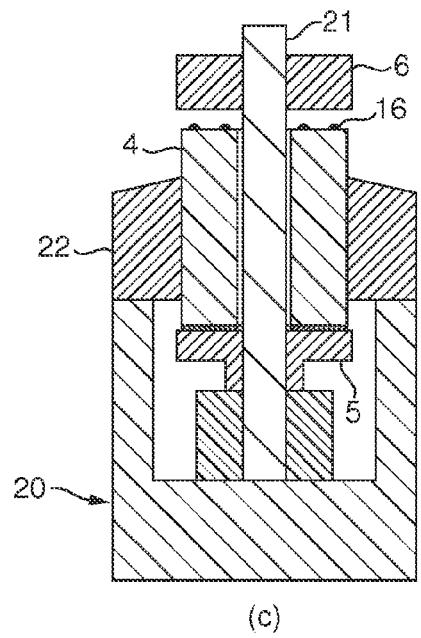
Figure 3:
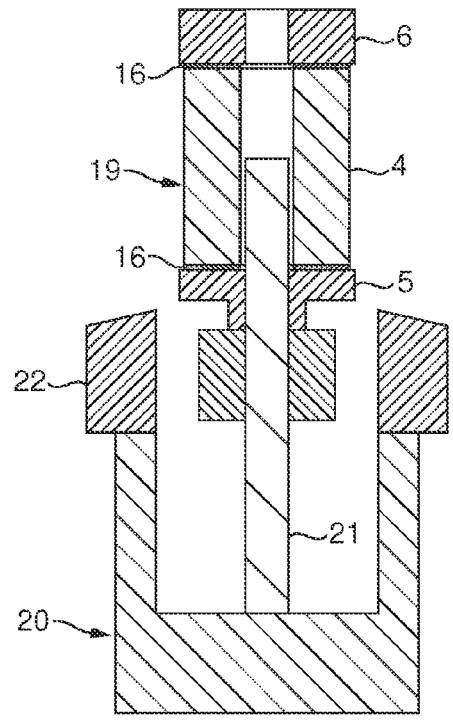
Figure 4:
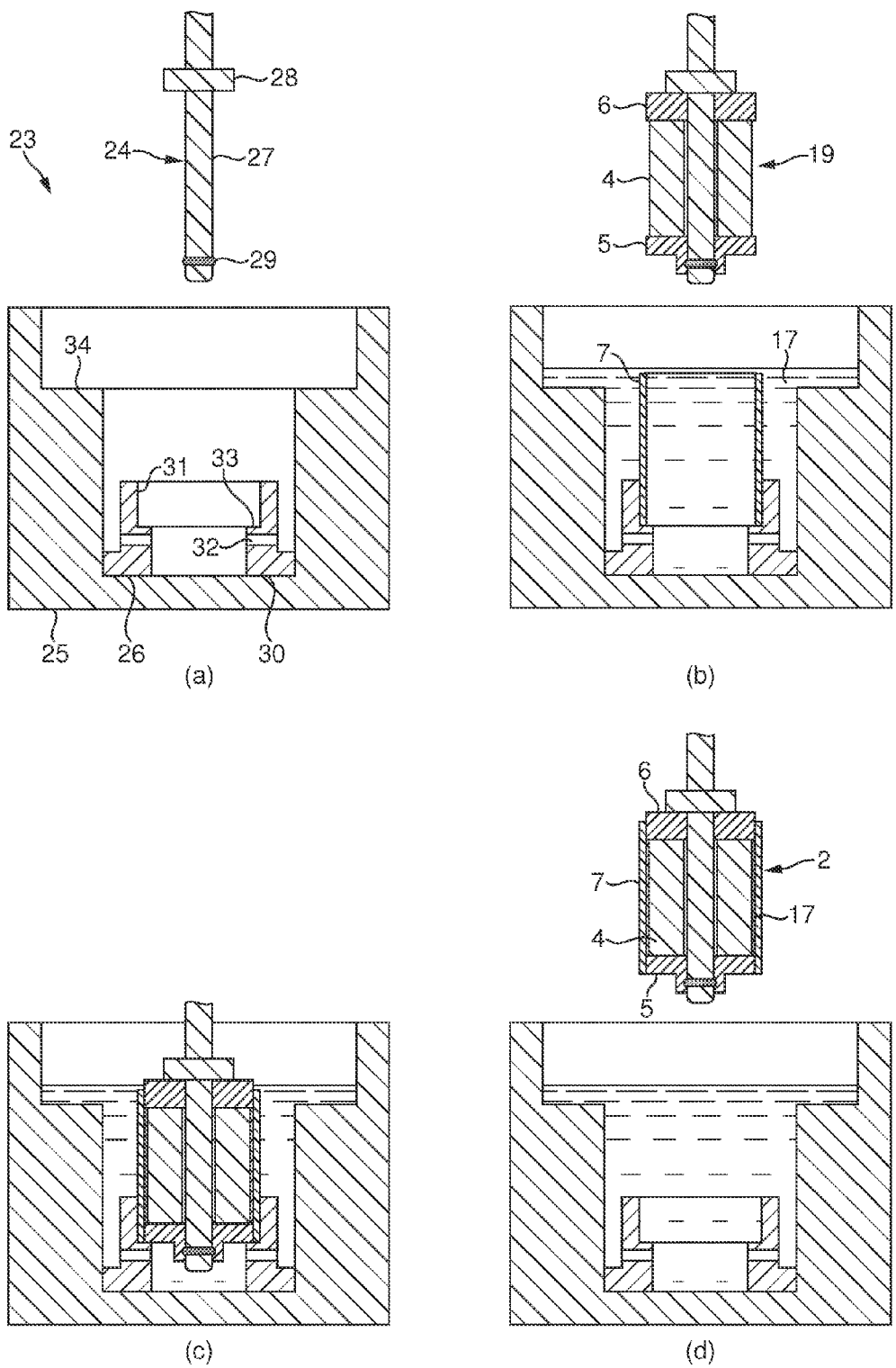
FIGS. 4a-4d illustrate a second stage in the manufacture of the rotor.
Figure 5:
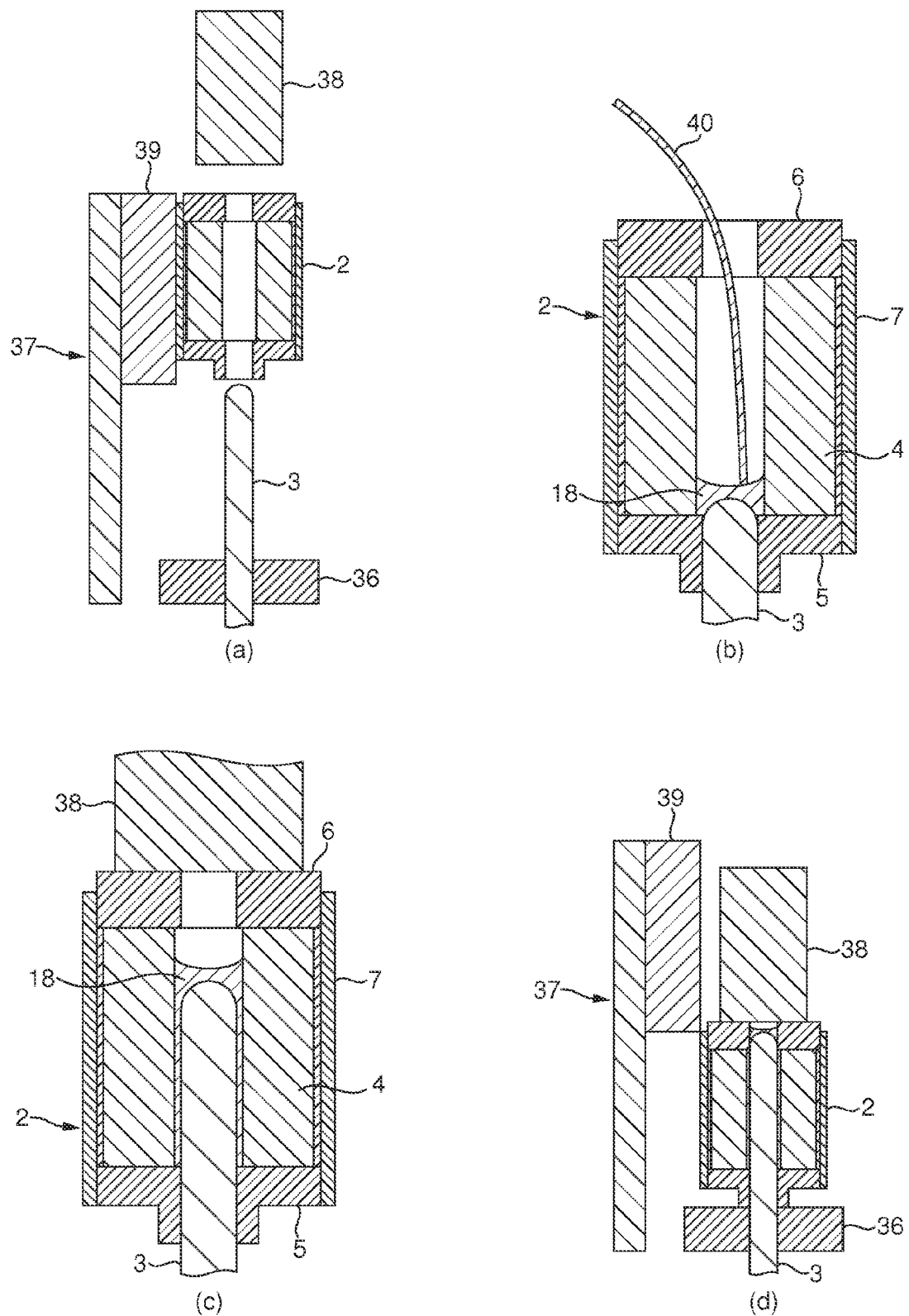
FIGS. 5a-5d illustrate a third stage in the manufacture of the rotor.

The rotor 1 of FIGS. 1 and 2 comprises a rotor core assembly 2 secured to a shaft 3.

The rotor core assembly 2 comprises a permanent magnet 4, a first end cap 5, a second end cap 6, and a sleeve 7.

The magnet 4 is cylindrical in shape and has a central bore 8 that extends through the magnet 4 from a first end 9 to a second end 10. The bore 8 is sized such that the shaft 3 forms a clearance fit with the magnet 4 when inserted into the bore 8.

Each end cap 5,6 is made of plastic and has a bore 12,13 formed therethrough. The bore 12,13 in each end cap 5,6 is sized such that the shaft 3 forms an interference fit with the end cap 5,6 when inserted into the bore 12,13. The bore 12,13 in each end cap 5,6 is thus smaller than the bore 8 in the magnet 4. Each end cap 5,6 has a mating face 14,15 that is secured to an end 9,10 of the magnet 4 by an adhesive 16. The end caps 5,6 are secured to the magnet 4 such that the outer diameter of the magnet 4 is aligned concentrically with the inner diameter of each end cap 5,6, i.e. the outer surface 11 of the magnet 4 is concentric with the bores 12,13 in the end caps 5,6. The mating face 14,15 of each end cap 5,6 has an outer diameter that is slightly larger than the outer diameter of the magnet 4. Consequently, each end cap 5,6, extends radially beyond the magnet 4.

The sleeve 7 is a hollow cylinder formed of a carbon-fiber composite. The sleeve 7 surrounds the magnet 4 and the end caps 5,6. The inner diameter of the sleeve 7 is sized such that a clearance fit is formed between the sleeve 7 and the magnet 4, and an interference fit is formed between the sleeve 7 and each of the end caps 5,6. An adhesive 17 is located in the clearance between the magnet 4 and the sleeve 7. The adhesive 17 is substantially free of voids and forms a continuous layer between the magnet 4 and the sleeve 7.

The shaft 3 extends through the bores 12,8 in the first end cap 5 and the magnet 4, and into the bore 13 in the second end cap 6. A clearance fit is formed between the shaft 3 and the magnet 4, and an interference fit is formed between the shaft 3 and each of the end caps 5,6. The shaft 3 is directly secured to the magnet 4 by an adhesive 18 located in the clearance between the shaft 3 and the magnet 4. The adhesive 18 is substantially free of voids and forms a continuous layer between the shaft 3 and the magnet 4. The rotor core assembly 2 is thus secured to the shaft 3 by the end caps 5,6 and by the adhesive 18 located between the shaft 3 and the magnet 4.

The shaft 3 does not extend all the way through the bore 13 in the second end cap 6. Instead, the shaft 3 extends into a part only of the bore 13. Adhesive 18 is then located in the remaining part of the bore 13. The adhesive 18 is the same type of adhesive as that located between the shaft 3 and the magnet 4 and is an artifact of the manufacturing process, which is described below in more detail.

When the rotor 1 accelerates, the shearing forces acting between the magnet 4 and the other components of the rotor 1 can be relatively large. As explained below, the adhesive joins between the magnet 4 and the end caps 5,6, and between the magnet 4 and the sleeve 7 are relatively weak. Consequently, without a good adhesive join between the magnet 4 and the shaft 3, the magnet 4 would slip and rotate relative to the other components. By having a continuous layer of adhesive 18 between the magnet 4 and the shaft 3, a strong bond is achieved between the two. Consequently, the rotor 1 is able to operate at relatively high rates of acceleration.

As the rotor rotates 1, radial forces stress the magnet 4 radially and circumferentially. At relatively high rotor speeds, these stresses may cause the magnet 4 to fracture and break apart, if unchecked. The sleeve 7, being formed of a carbon-fiber composite, is much stiffer than the magnet 4. The sleeve 7 therefore acts to oppose the stresses acting on the magnet 4. The adhesive 17 located between the magnet 4 and the sleeve 7 acts to transfer the stresses from the magnet 4 to the sleeve 7. If the adhesive layer 17 were incomplete, the magnet 4 would experience excessive stress at locations where there are voids in the adhesive 17. The excessive stress might then cause the magnet 4 to fracture. Since the sleeve 7 and end caps 5,6 surround and contain the magnet 4, the magnet 4 would be prevented from breaking apart. Nevertheless, the magnet 4 would most likely undergo a slight but significant mass redistribution, causing the rotor 1 to become unbalanced. By having a continuous layer of adhesive 17 between the magnet 4 and the sleeve 7, stresses are transferred from the magnet 4 to the sleeve 7 over the full outer surface 11 of the magnet 4. Consequently, excessive stress of the magnet 4 is avoided.

The end caps 5,6, in forming an interference fit with the sleeve 7, act to radially constrain the sleeve 7 and thus prevent movement of the sleeve 7 during subsequent rotation of the rotor 1. As a result, rotor imbalance due to movement of the sleeve 7 is prevented. In contrast, if the sleeve 7 were unconstrained, the position of the sleeve 7 might drift with continued use of the rotor 1 due to creep of the adhesive 17. Any drift in the position of the sleeve 7 would then introduce rotor imbalance.

A method of manufacturing the rotor 1 will now be described with reference to FIGS. 3a-5d.

As illustrated in FIGS. 3a-3d, a sub-assembly 19 comprising the magnet 4 and the end caps 5,6 is first assembled using a jig 20 that includes a pin 21 and a chuck 22. The first end cap 5 is inserted onto the pin 21. The pin 21 has a diameter that forms a slight interference fit with the end cap 5. Adhesive 16 is then applied to one or both of the mating face 14 of the end cap 5 and the end 9 of the magnet 4. The magnet 4 is then inserted onto the pin 21. Since the bore 8 in the magnet 4 is larger in diameter than the bore 12 in the end cap 5, a clearance fit is formed between the magnet 4 and the pin 21. The jaws of the chuck 22 are closed around the magnet 4 so as to concentrically align the outer diameter of the magnet 4 with the axis of the pin 21 and thus with the inner diameter of the end cap 5. The magnet 4 is then brought into contact with the end cap 5 such that an adhesive join is formed between the magnet 4 and the end cap 5. The adhesive 16 has a relatively fast curing time, which is why the magnet 4 is first aligned by the chuck 22 before being brought into contact with the end cap 5. If an adhesive having a slower cure time is used, the magnet 4 might alternatively be brought into contact with the end cap 5 before being aligned by the chuck 22. After the magnet 4 has been adhered to the first end cap 5, adhesive 16 is applied to one or both of the mating face 15 of the second end cap 6 and the other end 10 of the magnet 4. The second end cap 6 is then inserted onto the pin 21, which again forms a slight interference fit. The end cap 6 is then brought into contact with the magnet 4 such that an adhesive join is formed between the magnet 4 and the end cap 6. The sub-assembly 19 is then left for a short time to ensure that the adhesive 16 has fully cured before the sub-assembly 19 is removed from the pin 21.

Referring now to FIGS. 4a-4d, the sleeve 7 is secured to the sub-assembly 19 by means of a second jig 23. The second jig 23 comprises a press 24, an adhesive bath 25, and a fixture 26 located within the adhesive bath 25.

The press 24 includes a pin 27 along which an end stop 28 and an o-ring 29 are located. The o-ring 29 is located adjacent a free end of the pin 27, while the end stop 28 is located further along the pin 27. The pin 27 is inserted into the sub-assembly 19 via the bore 13 in the second end cap 6. The pin 27 is inserted into the sub-assembly 19 until the end stop 28 abuts the second end cap 6. The pin 27 forms a clearance fit with the magnet 4 and the end caps 5,6. The end stop 28 and the o-ring 29 are spaced along the pin 27 such that, when the end stop 28 abuts the second end cap 6, the o-ring 29 is located within the bore 12 of the first end cap 5. The o-ring 29 is sized so as to form a seal with the first end cap 5.

The fixture 26 comprises a base 30, a support wall 31 that extends upwardly from the base 30, and a plurality of channels 32 that extend through the support wall 31. The support wall 31 is cylindrical in shape and includes a step 33 in its inner diameter. The channels 32 through the support wall 31 are located below the step 33. The base 30 acts to locate the support wall 31 centrally in the adhesive bath 25, while the channels 32 provide fluid passageways for the adhesive 17.

The sleeve 7 is placed within the support wall 31. The inner diameter of the support wall 31 above the step 33 is sized so as to form a clearance fit with the sleeve 7. The inner diameter of the support wall 31 below the step 33 is smaller than the outer diameter of the sleeve 7. Consequently, the sleeve 7 rests on top of the step 33.

The bath 25 is filled with adhesive 17 such that the level of adhesive 17 covers the top of the sleeve 7. The sub-assembly 19 is then lowered into the adhesive bath 25 and pressed into the sleeve 7.

The outer diameter of the first end cap 5 and the inner diameter of the sleeve 7 are sized such that an interference fit is formed between the first end cap 5 and the sleeve 7. Consequently, as the sub-assembly 19 is pressed into the sleeve 7, the first end cap 5 scrapes off and removes any air bubbles that may be trapped to the inner surface of the sleeve 7. Additionally, the first end cap 5 acts as a plunger, driving adhesive 17 within the sleeve 7 out through the channels 32 in the support wall 31. The o-ring 29 prevents adhesive 17 entering the interior of the sub-assembly 19. The inner diameter of the support wall 31 below the step 33 is smaller than the outer diameter of the first end cap 5. The sub-assembly 19 is pressed into the sleeve 7 until the first end cap 5 abuts the step 33 in the support wall 31, thus preventing any further travel of the sub-assembly 19. The step 33 in the support wall 31 thus acts as a stop for the sub-assembly 19.

The outer diameter of the magnet 4 and the inner diameter of the sleeve 7 are sized such that a clearance fit is formed between the magnet 4 and the sleeve 7. Consequently, as the sub-assembly 19 is pressed into the sleeve 7, a clearance is formed between the magnet 4 and the sleeve 7. Since the level of adhesive 17 within the bath 25 covers the top of the sleeve 7, adhesive 17 immediately fills the clearance formed between the magnet 4 and sleeve 7. Moreover, owing to the interference fit formed between the first end cap 5 and the sleeve 7, pressing the sub-assembly 19 into the sleeve 7 actively draws adhesive 17 into the clearance between the magnet 4 and the sleeve 7. As a result, a continuous distribution of adhesive 17 is formed between the magnet 4 and the sleeve 7 along the full length of the magnet 4.

The outer diameter of the second end cap 6 and the inner diameter of the sleeve 7 are sized such that an interference fit is formed between the second end cap 6 and the sleeve 7. Consequently, when the sub-assembly 19 is pressed fully into the sleeve 7, and further travel of the sub-assembly 19 is prevented by the step 33 in the support wall 31, the adhesive 17 located between the magnet 4 and the sleeve 7 is sealed in by the two end caps 5,6. The length of the sleeve 7 is shorter than that of the sub-assembly 19. As a result, the second end cap 6 extends axially beyond the sleeve 7 when the sub-assembly 19 is pressed fully into the sleeve 7.

The bath 25 is filled to a level such that, when the sub-assembly 19 is pressed fully into the sleeve 7, the second end cap 6 extends above the level of the adhesive 17. This then prevents adhesive 17 entering the interior of the sub-assembly 19. As the sub-assembly 19 is pressed into the sleeve 7, the adhesive displaced by the sub-assembly 19 causes the level of adhesive 17 within the bath 25 to rise. The bath 25 therefore includes an overflow area 34 into which the displaced adhesive can flow. As a result, the level of adhesive 17 within the bath does not change significantly as the sub-assembly 19 is pressed into the sleeve 7. This then ensures that the adhesive 17 does not immerse the second end cap 6.

After the sub-assembly 19 has been fully pressed into the sleeve 7, the resulting rotor core assembly 2 is lifted out of the adhesive bath 25. The rotor core assembly 2 is held above the bath 25 for a short time to allow adhesive to drain from the exterior of the rotor core assembly 2. After draining, the rotor core assembly 2 is washed with water to remove any residual adhesive. The residual adhesive is then recovered from the wash for subsequent reuse. The rotor core assembly 2 is then removed from the pin 27 and placed into an oven, whereupon the adhesive 17 located between the magnet 4 and sleeve 7 is cured.

When pressing the sub-assembly 19 into the sleeve 7, adhesive 17 is prevented from entering the interior of the sub-assembly 19. This then has the benefit that the bore 8 in the magnet 4 is kept free from adhesive. Consequently, a good surface is provided for the adhesive that is subsequently used to secure the rotor core assembly 2 to the shaft 3. Nevertheless, in an alternative method, adhesive 17 may be permitted to enter the interior of the sub-assembly 19. The interior as well as the exterior of the rotor core assembly 2 are then drained and washed of adhesive 17 after pressing the sub-assembly 19 into the sleeve 7. This alternative method potentially simplifies the manufacture of the rotor core assembly 2 since there is no need to employ an o-ring 29 on the pin 27 and there is no need to control the level of adhesive 17 within the bath 25. However, a potential problem arises with this alternative method, namely corrosion of the magnet 4. Most magnet materials will corrode in the presence of water, which is used to wash the rotor core assembly 2 of residual adhesive. Any corrosion within the bore 8 of the magnet 4 is likely to weaken the adhesive join between the magnet 4 and the shaft 3. Corrosion may be avoided by coating or plating the magnet 4 beforehand. Alternatively, corrosion may be avoided by employing a non-corrosive solvent to wash the residual adhesive from the rotor core assembly 2. However, both options are likely to increase the cost of manufacture. For the particular magnets and adhesives that have been trialled to date, it has been found that a thin film of adhesive continues to coat the bore 8 of the magnet 4 even after washing. This thin film of adhesive then acts as a barrier to the wash, thus preventing corrosion of the magnet 4. Accordingly, corrosion may be avoided even when using water for the wash.

Referring now to FIGS. 5a-5d, the rotor core assembly 2 is secured to the shaft 3 by means of a third jig 35. The third jig 35 comprises a chuck 36, a holder 37 and a press 38.

The chuck 36 supports the shaft 3 vertically.

The holder 37 comprises a metal block 39 having a v-shaped channel formed along one side. The rotor core assembly 2 is held within the channel by the magnetic force that acts between the magnet 4 and the metal block 39. The holder 37 and chuck 36 are arranged such that the rotor core assembly 2 is held above the shaft 3 and the bore through the rotor core assembly 2 is aligned with the shaft 3.

The press 38 is located above the holder 37 and makes a first downward press onto the rotor core assembly 2, causing the shaft 3 to be inserted into the bore 12 of the first end cap 5. The outer diameter of the shaft 3 and the inner diameter of the first end cap 5 are sized such that an interference fit is formed between the shaft 3 and the first end cap 5. The press 38 is then retracted and an adhesive 18 is introduced into the bore 8 of the magnet 4. The adhesive 18 is introduced using a dispensing tube 40, which delivers a predetermined volume of adhesive 18 to the bottom of the bore 8. The press 38 then makes a second downward press onto the rotor core assembly 2, causing the shaft 3 to be inserted into the bore 8 of the magnet 4 and then into the bore 13 of the second end cap 5.

The outer diameter of the shaft 3 and the inner diameter of the magnet 4 are sized such that a clearance fit is formed between the shaft 3 and the magnet 4. The adhesive 18 forms a wet seal around the end of the shaft 3 between the shaft 3 and the magnet 4. The interference fit between the shaft 3 and the first end cap 5 forms an air-tight seal. Consequently, as the shaft 3 is inserted into the magnet 4, adhesive 18 is drawn into the clearance created between the shaft 3 and the magnet 4. The adhesive 18 maintains a wet seal around the shaft 3 as the shaft 3 is inserted through magnet 4 and into the second end cap 6. The net result is a continuous layer of adhesive 18 between the shaft 3 and the magnet 4 along the full length of the magnet 4.

The outer diameter of the shaft 3 and the inner diameter of the second end cap 6 are sized such that an interference fit is formed between the shaft 3 and the second end cap 6. The shaft 3 extends only partly into the bore 13 of the second end cap 6. An interference fit is therefore formed between the shaft 3 and the second end cap 6 along a part only of the bore 13. Excess adhesive 18, which was not drawn into the clearance between the shaft 3 and the magnet 4, collects in the remaining part of the bore 13.

The adhesive 18 is both anaerobic and UV curable. Accordingly, upon inserting the shaft 3 into the bore 13 of the second end cap 6, the adhesive 18 between the shaft 3 and the magnet 4 begins to cure. The press 38 is then retracted and the bore 13 in the second end cap 6 is exposed to UV light so as to cure the excess adhesive 18 retained in the bore 13. The finished rotor 1 is then removed from the jig 35.

When inserting the shaft 3 into the bore 8 of the magnet 4, it is important that the adhesive 18 maintains a wet seal between the shaft 3 and the magnet 4. If a wet seal is not maintained, air rather than adhesive will be drawn into the clearance between the shaft 3 and the magnet 4, resulting in an incomplete adhesive layer. It is therefore important that the adhesive 18 introduced into the bore 8 of the magnet 4 is of sufficient volume to ensure that a wet seal is maintained while the shaft 3 is inserted through the magnet 4. On the other hand, if too much adhesive 18 is introduced, the bore 13 in the second end cap 6 will not be able to retain the excess adhesive. Accordingly, a predetermined volume of adhesive 18 is introduced into the bore 8 of the magnet 4. The predetermined volume takes into account the various tolerances associated in the rotor 1 so as to ensure that a wet adhesive seal is maintained and that the excess adhesive is retained in the bore 13 of the second end cap 6.

If the adhesive 18 were introduced at the very top of the bore 8 in the magnet 4, part of the adhesive 18 would most likely to stick to the magnet 4 as the adhesive 18 runs down the bore 8. This would then reduce the volume of adhesive 18 around the end of the shaft 3. A wet seal between the shaft 3 and the magnet 4 might not then be maintained as the shaft 3 is inserted through the magnet 4. Accordingly, a dispensing tube 40 is used to deliver the adhesive 18 to the bottom of the bore 8 in the magnet 4. Additionally, in order to encourage adhesive to run off the end of the shaft 3, the end of the shaft 3 is rounded or tapered.

With the method of manufacture described above, a continuous layer of adhesive is formed between the shaft 3 and the magnet 4 along the full length of the magnet 4. Accordingly, a strong bond is formed between the shaft 3 and the magnet 4. By employing an end cap 5 that forms a seal with the shaft 3, adhesive 18 is actively drawn into the clearance between the shaft 3 and the magnet 4 as the shaft 3 is inserted into the magnet 4. As a result, a continuous layer of adhesive 18 may be formed irrespective of the size of the clearance between the shaft 3 and the magnet 4.

In addition to forming a continuous layer of adhesive 18 between the shaft 3 and the magnet 4, a continuous layer of adhesive 17 is also formed between the magnet 4 and the sleeve 7. Consequently, tensile stresses acting on the magnet 4 are transferred from the magnet 4 to the sleeve 7 over the full outer surface 11 of the magnet 4. As a result, excessive strain and possible fracture of the magnet 4 may be avoided.

Owing to the physical properties of many magnet materials, it is generally difficult to machine a magnet with a bore having relatively tight geometric tolerances. By securing the end caps 5,6 to the magnet 4 such that outer diameter of the magnet 4 is concentrically aligned with the inner diameter of the end caps 5,6, the outer diameter of the magnet 4 is concentrically aligned with the shaft 3 irrespective of any eccentricity in the bore 8 of the magnet 4. Indeed, the outer diameter of the magnet 4 will generally have a concentricity relative to the shaft 3 that is smaller than that of the inner diameter of the magnet 4.

An alternative method of manufacturing the rotor core assembly 2 will now be described with reference to FIGS. 6 to 8.

The sub-assembly 19 comprising the magnet 4 and the end caps 5,6 is first assembled in the same manner as that described above and illustrated in FIGS. 3a-3d. After removing the sub-assembly 19 from the jig 20, the sleeve 7 is pressed on to the sub-assembly 19 using a further jig (not shown).

Rather than removing the sub-assembly 19 from the jig 20 of FIGS. 3a-3d and then using a different jig to press the sleeve 7 onto the sub-assembly 19, the sleeve 7 may instead be pressed onto the sub-assembly 19 using the same jig 20. Owing to the interference fit formed between the end caps 5,6 and the sleeve 7, the end caps 5,6 will want to undergo a slight contraction when the sleeve 7 is pressed onto the sub-assembly 19. However, the interference fit formed between the end caps 5,6 and the pin 21 of the jig 20 may make contraction difficult. Indeed, depending on the tolerance stack, it may not be possible to press the sleeve 7 onto the sub-assembly 19 without excessive force being applied and/or potentially damaging the sleeve 7. In contrast, by removing the sub-assembly 19 from the jig 20 and then employing a separate jig to press the sleeve 7 onto the sub-assembly 19, the bores 12,13 in the end caps 5,6 may be kept free. As a result, contraction of the end caps 5,6 is made easier and thus the sleeve 7 may be pressed onto the sub-assembly 19 using a smaller force and/or without damaging the sleeve 7.

In pressing the sleeve 7 onto the sub-assembly 19, an interference fit is formed between the sleeve 7 and each of the end caps 5,6, and a clearance fit is formed between the sleeve 7 and the magnet 4. At this stage, no adhesive is located in the clearance between the magnet 4 and the sleeve 7. In contrast to the embodiment described above and illustrated in FIG. 1, one of the end caps 5 includes an axial groove 41 formed along the outer surface of the end cap 5, as shown in FIG. 6. As illustrated in FIG. 7, the axial groove 41 provides a conduit between the exterior of the assembly 2 and the clearance between the magnet 4 and the sleeve 7.

Figure 8:
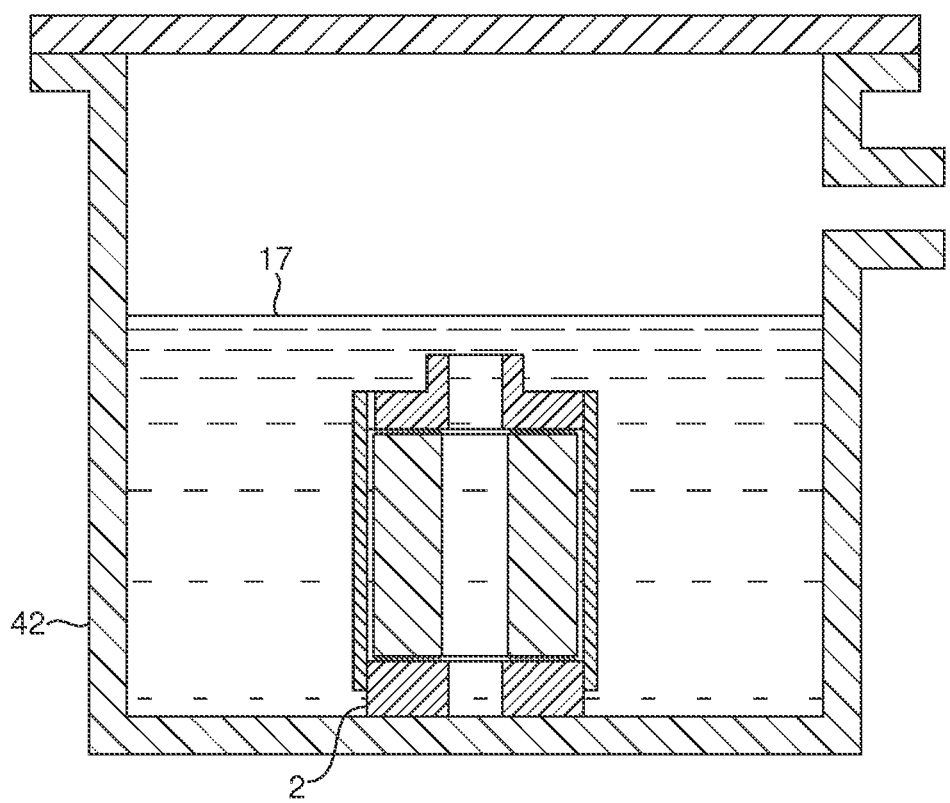
FIG. 8 illustrates a stage in the manufacture of the alternative rotor core assembly.

Referring now to FIG. 8, after pressing the sleeve 7 onto the sub-assembly 19, the resulting assembly 2 is placed into a vessel 42 for vacuum impregnation. The assembly 2 is immersed in adhesive 17 located within the vessel 42. The vessel 42 is then sealed and the pressure within the vessel 42 is reduced to create a partial vacuum (e.g. around 0.01 Torr). The partial vacuum removes air from the vessel 42, the adhesive 17, and the assembly 2. The partial vacuum is maintained for a period of time (e.g. 10 minutes) to ensure adequate deaeration. The pressure within the vessel 42 is then increased to atmospheric. This causes adhesive 17 within the vessel 42 to be driven into the clearance between the magnet 4 and the sleeve 7 via the groove 41 in the end cap 5. The vessel 42 is then left at atmospheric pressure for a period of time (e.g. 2 minutes) to allow adhesive 17 to penetrate the various voids (e.g. pores and cracks) in the surfaces of the magnet 4 and the sleeve 7. The assembly 2 is then lifted out of the adhesive reservoir and allowed to drain. After draining, the assembly 2 is placed into a cold water bath to wash the assembly 2 of any residual adhesive. The residual adhesive is subsequently recovered from the wash for reuse. Finally, the rotor core assembly 2 is placed into a hot water bath for a period of time sufficient to cure the adhesive 17 located between the magnet 4 and the sleeve 7.

The groove 41 in the end cap 5 provides a conduit through which air can be evacuated from and adhesive 17 can be introduced to the clearance between the magnet 4 and the sleeve 7. By employing vacuum impregnation, the adhesive layer 17 formed between the magnet 4 and the sleeve 7 is substantially free of voids. As a result, tensile stresses acting on the magnet 4 are transferred from the magnet 4 to the sleeve 7 over the full outer surface 11 of the magnet 4.

The groove 41 in the end cap 5 is of a size that permits the ingress of adhesive 17 during impregnation but restricts the leakage of adhesive 17 during subsequent transport and washing. The size of the groove 41 will therefore depend on the viscosity of the adhesive 17 used.

Figure 6:
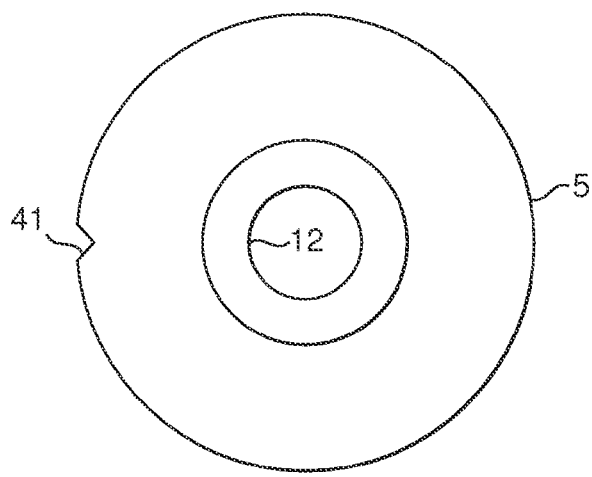
FIG. 6 is a plan view of an end cap of an alternative rotor core assembly in accordance with the present invention.
Figure 7:
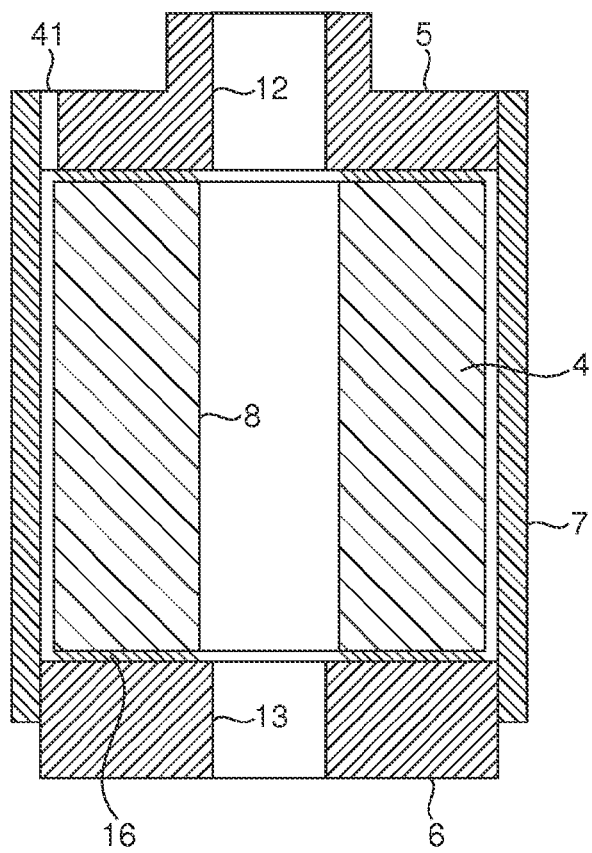
FIG. 7 is a sectional view of the alternative rotor core assembly.

Although the end cap 5 illustrated in FIG. 6 has a single groove 41, additional grooves may be provided. Additional grooves may increase the speed of deaeration thus reducing the period of time required at reduced pressure. One or more grooves may also be included in the other of the end caps 6. However, the provision of grooves in both end caps 5,6 is likely to increase the likelihood of adhesive leaking from the clearance during transport and washing.

The groove 41 in the end cap 5 of FIG. 6 is linear. However, the groove 41 might equally be non-linear. For example, the groove 41 might be convoluted or helical. The use of a non-linear groove may help reduce the potential loss of adhesive 17 during transport and washing. Moreover, rather than having a groove 41, the end cap 5 might conceivably include a through-hole, through which air can be evacuated from and adhesive 17 can be introduced to the clearance between the magnet 4 and the sleeve 7.

The method of vacuum impregnation described above is generally referred to as wet vacuum impregnation. However, other methods of vacuum impregnation may equally be employed. For example, dry vacuum impregnation may be used. Additionally, rather than increasing the pressure to atmospheric, the pressure within the vessel 42 may be increased to pressures in excess of atmospheric.

In the method described above, the rotor core assembly 2 is manufactured by first securing the end caps 5,6 to the magnet 4 to create a sub-assembly 19, and then pressing the sub-assembly 19 into the sleeve 7. However, when employing vacuum impregnation, the rotor core assembly 2 may be manufactured without having to first assemble the sub-assembly 19, i.e. without having to secure the end caps 5,6 to the magnet 4. For example, the rotor core assembly 2 may be assembled by pressing the first end cap 5 into the sleeve 7, the end cap 5 forming an interference fit. The magnet 4 may then be pressed into the sleeve 7 so as to abut the first end cap 5. The magnet 4 may have a diameter that forms a transition fit or loose interference fit with the sleeve 7. As a result, the outer diameter of the magnet 4 is concentrically aligned relative to the outer diameters, and thus the inner diameters, of the end caps 5,6. Finally, the second end cap 6 is pressed into the sleeve 7 so as to abut the magnet 4, the second end cap 6 forming an interference fit with the sleeve 7. Although the magnet 4 forms a transition fit or slight interference fit with the sleeve 7, there will nevertheless be locations at which the magnet 4 is not in contact with the sleeve 7, i.e. there will be locations at which there is a clearance between the magnet 4 and the sleeve 7. The assembly 2 is then placed into the vessel 42 and subjected to vacuum impregnation in the manner described above. Accordingly, when employing vacuum impregnation, the rotor core assembly 2 may be manufactured without the need to secure the end caps 5,6 directly to the magnet 4.

In the various methods described above, different adhesives 16,17,18 are used to secure the end caps 5,6 to the magnet 4, the sleeve 7 to the magnet 4, and the shaft 3 to the magnet 4. The reason for this is that each adhesive is employed for a different purpose. The end caps 5,6, for example, are secured to the magnet 4 with the intention of concentrically aligning the outer diameter of the magnet 4 with the inner diameters of the end caps 5,6. The end caps 5,6 are not, however, required to hold the magnet 4 to the shaft 3; this task is instead performed by the adhesive 18 located between the shaft 3 and the magnet 4. The strength of the adhesive 16 between the end caps 5,6 and the magnet 4 is not particularly important. Accordingly, in order to simplify the manufacturing process, the end caps 5,6 are secured to the magnet 4 using an adhesive 16 that cures relatively quickly in atmospheric moisture, e.g. Loctite® 435. Since the adhesive cures in atmospheric moisture and has a relatively quick cure time, the adhesive is unsuitable for securing the magnet 4 to the sleeve 7 or the magnet 4 to the shaft 3.

The adhesive 17 between the magnet 4 and the sleeve 7 is intended to transfer radial and circumferential stresses from the magnet 4 to the sleeve 7. A key requirement of the adhesive 17 is therefore the ability to penetrate and fill the various voids in the surfaces of the magnet 4 and the sleeve 7. Accordingly, a low-viscosity impregnation adhesive is employed between the magnet 4 and the sleeve 7. Owing to the manner in which the rotor core assembly 2 is manufactured, the adhesive 17 is one that can be washed relatively easily from the exterior of the rotor core assembly 2. A suitable adhesive is Asec AS-6704. This particular adhesive is heat curable, which is why the manufacturing methods described above refer to heat curing the rotor core assembly 2 after washing.

The adhesive 18 between the shaft 3 and the magnet 4 must be able to withstand the shearing forces that act between the shaft 3 and the magnet 4 during rotation. Accordingly, the most important criterion for this adhesive 18 is shear strength. A suitable adhesive is Asec AS-5503. This particular adhesive can be cured anaerobically, by UV or by heat. Accordingly, the adhesive 18 between the shaft 3 and the magnet 4 can be cured anaerobically, while the excess adhesive 18 that collects in the bore 13 of the second end cap 6 can be cured by UV light. Alternatively, the adhesive 18 between the shaft 3 and the magnet 4 might be cured by heat or by UV light, e.g. if a transparent end cap 5,6 is employed.

Particular embodiments of the rotor 1 and its methods of manufacture have thus far been described. However, modifications to the rotor 1 and/or the methods of manufacture may be made without departing from the scope of the invention. For example, the end caps 5,6 need not be formed of plastic. The use of plastic, however, reduces the cost and weight of the rotor 1. Additionally, plastic end caps 5,6 do not adversely interfere or distort the magnet flux of the magnet 4, and are not susceptible to inductive heating. The sleeve 7, likewise, need not be formed of a carbon-fiber composite. Other materials that are conventionally used for reinforcing sleeves might equally be used, e.g. stainless steel or Inconel®.

When securing the rotor core assembly 2 to the shaft 3, as illustrated in FIGS. 5a-5d, the shaft 3 does not extend all the way through the bore 13 of the second end cap 6. Excess adhesive 18 then collects in that part of the bore 13 not occupied by the shaft 3. In an alternative embodiment, the shaft 3 may extend all the way through the second end cap 6. The shaft 3 and/or the bore 13 of the second end cap 6 are then shaped so as to define a clearance, into which the excess adhesive 18 collects. For example, the upper part of the bore 13 may be chamfered or the end of the shaft 3 may be stepped. The shaft 3 nevertheless continues to form an interference fit with a lower part of the bore 13 in the second end cap 6. Excess adhesive 18 then collects in the upper part of the bore 13.

Where reference is made to pressing a particular component into another component, it will be appreciated that the converse may be employed. For example, in the first-described method of assembling the rotor core assembly 2, the sleeve 7 is placed into the adhesive bath 25 and the sub-assembly 19 is then lowered and pressed into the sleeve 7. Equally, however, the sub-assembly 19 may first be placed into the adhesive bath 25 and then the sleeve 7 lowered and pressed onto the sub-assembly 19. In this instance, the bath 25 may include a central support pin that holds and locates the sub-assembly 19 within the bath 25. The press acting on the sleeve 7 might then include an opening through which air inside the sleeve 7 is free to escape as the sleeve 7 is pressed onto the sub-assembly 19.

The invention claimed is:

1. A rotor core assembly comprising a magnet, a first end cap located at an end of the magnet, a second end cap located at an opposite end of the magnet, a sleeve that surrounds the magnet and the end caps, the sleeve forming an interference fit with each of the end caps, and an adhesive located between the magnet and the sleeve.

2. A rotor core assembly as claimed in claim 1, wherein the rotor core assembly comprises a bore that extends through the end caps and the magnet for receiving a shaft.

3. A rotor core assembly as claimed in claim 2, wherein the end caps are secured to the magnet such that the outer diameter of the magnet is concentric with the inner diameters of the end caps.

4. A rotor core assembly as claimed in claim 1, wherein the end caps are secured to the magnet by an adhesive.

5. A rotor core assembly as claimed in 4, wherein the end caps are secured to the magnet by an adhesive different to that located between the sleeve and the magnet.

6. A rotor core assembly as claimed in claim 1, wherein the magnet is cylindrical and each end cap extends radially beyond the magnet.

7. A rotor core assembly as claimed in claim 1, wherein the sleeve forms a clearance fit with the magnet and the adhesive forms a continuous layer between the magnet and the sleeve.

8. A rotor core assembly as claimed in claim 1, wherein the end caps are formed of plastic.

* * * * *